United States Patent [19]

Morner

[11] Patent Number: 4,909,539
[45] Date of Patent: Mar. 20, 1990

[54] SAFETY BELT SYSTEM

[75] Inventor: Bengt O. J. S. Morner, Hovas, Sweden

[73] Assignee: Autoliv Development AB, Vargarda, Sweden

[21] Appl. No.: 929,848

[22] Filed: Nov. 13, 1986

[30] Foreign Application Priority Data

Nov. 14, 1985 [GB] United Kingdom ............... 8528149

[51] Int. Cl.⁴ .................. B60R 22/06; B60R 22/22
[52] U.S. Cl. .................. 280/801; 280/804; 280/808; 297/483
[58] Field of Search .............. 280/801, 802, 804, 806, 280/808, 803; 180/268; 297/464, 468, 473, 474, 483

[56] References Cited

U.S. PATENT DOCUMENTS

| 3,822,760 | 7/1974 | Lindblad | 280/804 |
| 3,863,983 | 2/1975 | Wriedt | 280/804 |
| 3,888,509 | 6/1975 | Willey | 280/808 |
| 4,213,652 | 7/1980 | Irwin et al. | 297/478 |
| 4,256,331 | 3/1981 | Schwanz et al. | 280/804 |
| 4,350,369 | 9/1982 | Chika | 280/804 |
| 4,457,538 | 7/1984 | Watanabe et al. | 280/801 |
| 4,482,188 | 11/1984 | Tilly | 280/801 |
| 4,496,170 | 1/1985 | Sasaki et al. | 280/801 |

FOREIGN PATENT DOCUMENTS

| 2603571 | 8/1976 | Fed. Rep. of Germany. |
| 2929108 | 1/1980 | Fed. Rep. of Germany. |
| 2024606 | 6/1979 | United Kingdom. |

Primary Examiner—Richard A. Bertsch
Attorney, Agent, or Firm—Spencer & Frank

[57] ABSTRACT

A passive safety belt arrangement for a motor vehicle which comprises a guide located at the center of the motor vehicle to guide a belt from a retractor reel over the shoulder of a person sitting on a seat of the motor vehicle, the belt passing to a carriage which is movable along a horizontal rail located between the seat and the side of the car. A motor drives the carriage along the rail. A locking station receives the carriage at a terminal position. When an accident occurs the carriage moves from a normal position within a locking station to bring part of the carriage into engagement with a detent provided in the locking station.

33 Claims, 5 Drawing Sheets

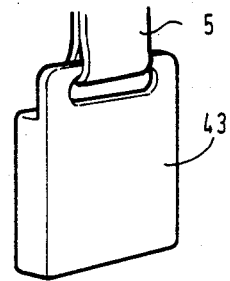
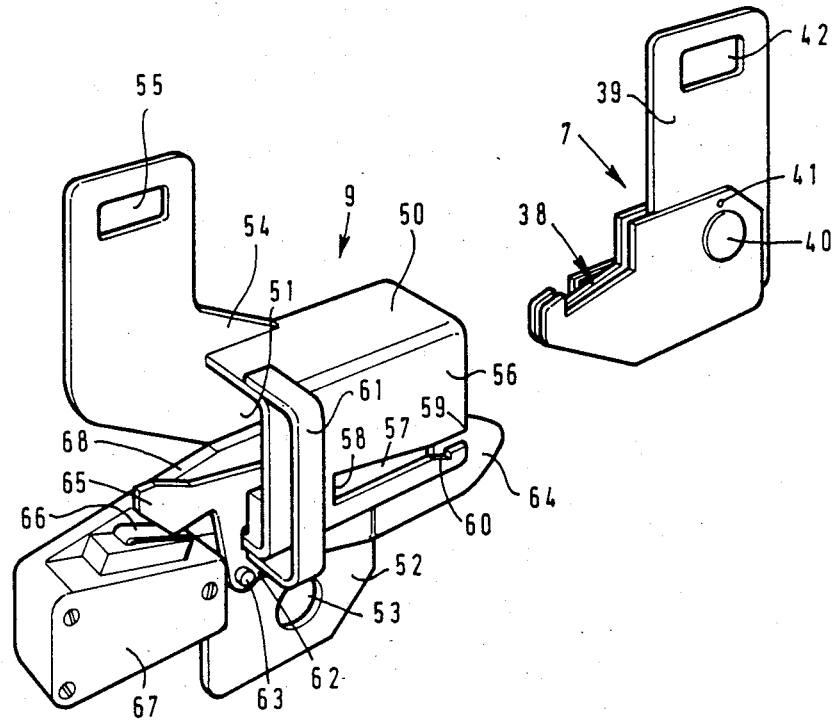
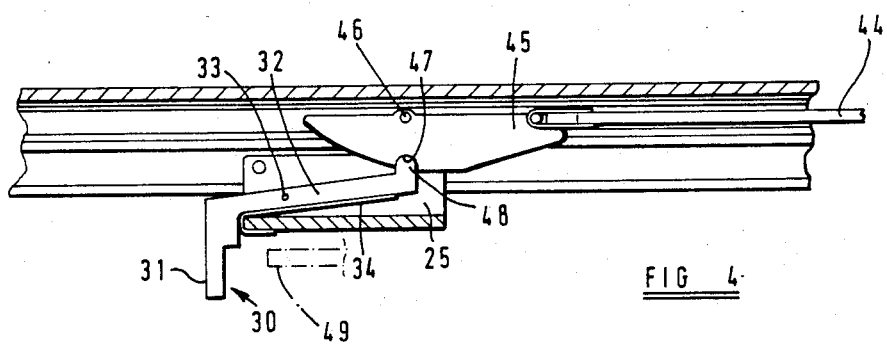
FIG 3
FIG 4

SAFETY BELT SYSTEM

BACKGROUND OF THE INVENTION

This invention relates to a safety belt system or more particularly relates to a safety belt system for use in a motor car.

The invention relates specifically to a safety belt system of the type that is known as "passive" safety belt system in which the safety belt arrangement incorporates a motor, and the arrangement is such that when a person sits in a motor car the safety belt is automatically positioned on that person in order to retain the person in position.

SUMMARY OF THE INVENTION

According to one aspect of this invention there is provided a safety belt arrangement for a motor vehicle, said safety belt arrangement comprising a retractor reel for a safety belt, and guide means for guiding the belt from said reel, said guide means being located at a position at or adjacent the centre of the motor vehicle to guide the belt over the shoulder of a person sitting on a seat in the motor vehicle, the belt passing to a carriage, which is movable along a rail, motor means being provided to move the carriage along the rail, the rail being a substantially horizontal rail located at a position between the seat and the side of the car.

Preferably a locking station is provided on the rail adjacent the seat, the locking station being adapted to lockingly receive the said carriage.

Conveniently the safety belt is releasably connected to the carriage.

Preferably the safety belt is releasably connected to the carriage by means of a releasable buckle, the locking station being provided with fixed means adapted to receive said releasable buckle.

Advantageously the rail is secured to the floor of the motor vehicle at a position between the seat and the side of the motor vehicle.

Preferably the rail is secured to the door sill of the motor vehicle.

Advantageously the rail is formed integrally with the door sill of the motor vehicle.

According to another aspect of this invention there is provided a safety belt arrangement for use in a motor vehicle, said safety belt arrangement incorporating a safety belt attached to a carriage movable along a rail associated with a locking station adapted lockingly to receive the carriage in such a position that under accident conditions the force applied to the said carriage by said safety belt defines an axis making an acute angle with said rail, the housing being provided with a detent adapted to cooperate with part of the carriage, said carriage being adapted to be moved into and out of the housing and along the rail without said part of the carriage coming into engagement with said detent, said carriage being adapted to move from its normal position within the housing when subjected to a force applied to said carriage by said safety belt under accident conditions to bring said part of the carriage into engagement with said detent to prevent the carriage from emerging from the locking station.

Preferably the carriage incorporates a hook-like projection which, when the carriage enters the locking station is located adjacent a detent, said hook-like projection being located to engage said detent when the carriage is moved from its normal position in the housing when subjected to said force.

Conveniently the detent is constituted by an element secured to the housing but having a part spaced therefrom to enable the hook-like projection to pass between said part and said housing.

Advantageously the carriage incorporates a part which is inserted into a slot formed in said locking station when the carriage is received within the locking station, one part of the slot defining a recess adapted to receive part of the carriage when the carriage is moved from its normal position within the housing when subjected to said force.

Conveniently said slot is a closed slot, the slot being broader at its closed end than at its open end, to permit tilting of the carriage whilst said part of the carriage is retained within the slot, the tilting of the carriage causing said part to enter said recess.

Preferably the carriage comprises a substantially "U" sectioned channel member, one side wall of which defines said hook-like projection.

Preferably said carriage comprises a substantially "U" section member, the base of the channel being adapted to be received within said slot.

Conveniently the locking station is provided with a locking member, means being provided to move the locking member to a locking position to retain the carriage in the locking station when the carriage has been received in the locking station.

Advantageously motor means are provided associated with an elongate drive member adapted to move said carriage, means being provided, adapted to be actuated when the carriage enters the locking station to switch off the motor.

Preferably movement of the locking member actuates switch means, the switch means being connected so that actuation of the switch means causes said motor to be switched off.

Conveniently a motor is provided associated with an elongate drive element adapted to drive said carriage.

Advantageously said elongate drive element is provided with an elongate connecting element which is releasably connected to the carriage so that the drive element can be connected to and disconnected from the carriage.

Preferably a spring biassed member is provided on the carriage which is adapted to be normally biassed into driving engagement with said connecting element, means being provided to disconnect said spring biassed member from the connecting element at the locking station.

Conveniently said spring biassed member forms part of a pivoted lever arrangement, a further part of the pivoted lever arrangement being located to engage a fixed element when the carriage enters the housing to cause the lever to pivot, thus disconnecting the lever from the connecting element.

Preferably the connecting element defines a recess adapted to engagingly receive part of said spring biassed member.

Advantageously the connecting element is adapted to engage part of said locking member to move the locking member to the locking position.

Conveniently the carriage is mounted on the rail by protruding elements which are engaged in recesses formed in the rail, one or more of the protruding elements being deformed as the carriage moves from its normal position when subjected to said force.

Advantageously the safety belt is releasably attached to said carriage.

Preferably the safety belt is releasably attached to said carriage by means of a releasable buckle, additonal means being provided on the locking station adapted to receive said buckle to enable the safety belt to be buckled to the locking station instead of being buckled to the carriage.

Conveniently the safety belt is attached to a retractor reel, guide means being provided for guiding the belt from said reel, said guide means being located at a position at or adjacent the centre of the motor vehicle to guide the belt over the shoulder of a person sitting on a seat of the motor vehicle, the belt then passing to the carriage, the rail being substantially horizontal and being located at a position between the seat and the side of the car.

BRIEF DESCRIPTION OF THE DRAWINGS

In order that the invention may be more readily understood, and so that further features thereof may be appreciated, the invention will now be described, by way of example, with reference to the accompanying drawings in which:

FIG. 3 is a perspective view showing the locking station and the carriage from the other side, FIG. 4 is a side view showing a draw tape and showing part of the carriage, in section, illustrating how the draw tape is connected to the carriage.

DESCRIPTION OF PREFERRED EMBODIMENTS

Figure 1:
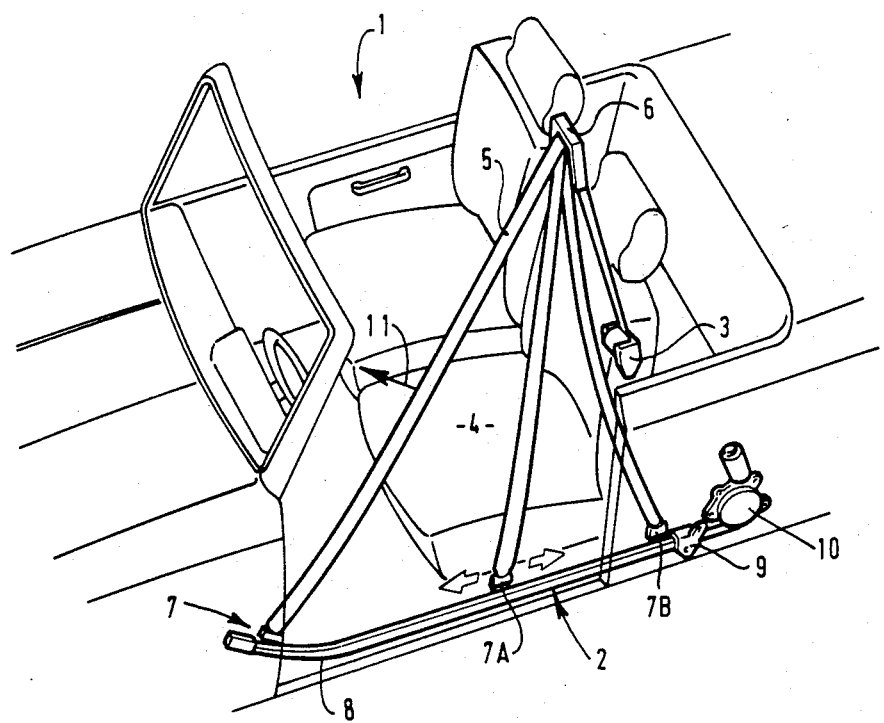
FIG. 1 is a diagramatic perspective view of a motor car fitted with a safety belt arrangement in accordance with the invention.

Referring to the drawings FIG. 1 schematically illustrates a motor vehicle 1, which is provided with a safety belt arrangement 2 in accordance with the invention on one seat of the vehicle. Only one seat belt arrangement 2 is illustrated for the sake of clarity of illustration.

The seat belt arrangement includes a retractor reel 3 of any convenient design, which is illustrated mounted on the floor of the motor vehicle to the rear of the front seat 4. The retractor reel 3 may be mounted at any convenient position either on the floor of the vehicle, or even on the back of the seat 4. The safety belt 5 from the retractor reel 3 is fed through a guide 6. The guide 6 is located at a position which is on the side of the seat 4 closest to the centre of the car, as opposed to being on the side of the seat 4 which is closest to the door or side wall of the car. The guide 6 is at an elevated position so that the seat belt 5 emerging through the guide 6 may easily pass over the shoulder of a person sitting on the seat 4.

The free end of the belt 5 is connected to a movable carriage 7 which is adapted to slide along a guide rail or track 8 which is mounted in position between the seat 4 and the side of the car that incorporates the door (not shown) through which the person who will occupy the seat 4 enters the car. As shown in FIG. 1, the front end of the rail 8 is curved upwardly. The rail 8 may be mounted on the floor of the car between the side wall of the car and the seat 4 or may be mounted on the door sill under the door, or may even be incorporated in the door sill. As indicated in the drawing the carriage 7 may move along the rail 8 from an initial forward position to occupy the positions 7A, 7B and a locking station 9 is provided releasably to retain the carriage in the position 7B adjacent the base of the back of the seat 4. A motor arrangement 10 is provided which imparts movement to a control tape or the like extending through the track 8 causing the carriage to move between the various positions illustrated.

Whilst the details of the design of the carriage, the track and the locking station of the presently described embodiment of the invention will be described hereinafter in greater detail, the general operation of the safety belt arrangement will now be described.

When a person enters the motor car illustrated in FIG. 1, the carriage 7 will be in its forwardmost position, with the safety belt 5 extending from the carriage to the guide 6. The person may thus easily enter the car sliding under the belt, and sitting on the seat 4. The safety belt system may be actuated by many different sensor arrangements. For example a sensor may be incorporated in the seat 4 to determine when a person is sitting on the seat, and a sensor may also be provided to sense when the door is closed. When the door is closed and a person is sitting on the seat the safety belt system may be actuated. Alternatively the safety belt system may be actuated when the ignition key is turned in the motor vehicle.

Regardless of the sensor arrangement used to initiate operation of the seat belt arrangement, when the seat belt arrangement is actuated the motor 10 will serve to move the carriage along the rail 8 through the position 7A and into the position 7B. As the carriage moves in this way the safety belt is caused to lie across the chest of the person sitting in the seat 4.

The carriage 7 eventually reaches the position 7b and the carriage is then locked in position in the locking station 9. The motor is then switched off.

Any excess belt with be withdrawn into the retractor reel 3, and thus the belt will have an appropriate initial tension. The person sitting in the motor vehicle may, under normal circumstances, move forwardly withdrawing a short extra length of belt 5 from the reel 3, but in an accident situation, when the motor vehicle will be accelerating or decelerating rapidly, the reel 3 will lock in position, thus preventing further belt 5 from being paid out.

When the person in the motor vehicle wishes to leave the motor vehicle, in response to an appropriate sensor arrangement, which may respond to the ignition being switched off, or which may respond to the door being opened, the motor 10 will again be activated, causing the carriage to be disengaged from the locking station 9 and subsequently causing the carriage to be returned to its initial forwardmost position. The occupant of the car may then readily climb out of the car.

If it is thought that the length of the belt 5 extending between the guide 6 and the carriage 7 when the carriage 7 is in its forwardmost position will hinder the person getting into or out of the car additional means may be provided to retain the belt in a convenient position. For example a hook or the like may be provided in the region of the dashboard of the vehicle, and the driver may at appropriate times hook part of the belt into the hook so that the belt is not in the way, thus facilitating entry and exit from the vehicle. Alternatively a supplementary length of belt may be provided emerging from an appropriately located retractor reel adapted to apply a force to the belt 5 in the direction indicated by the arrow 11, thus again serving to facilitate entry to and exit from the vehicle.

Figure 2:
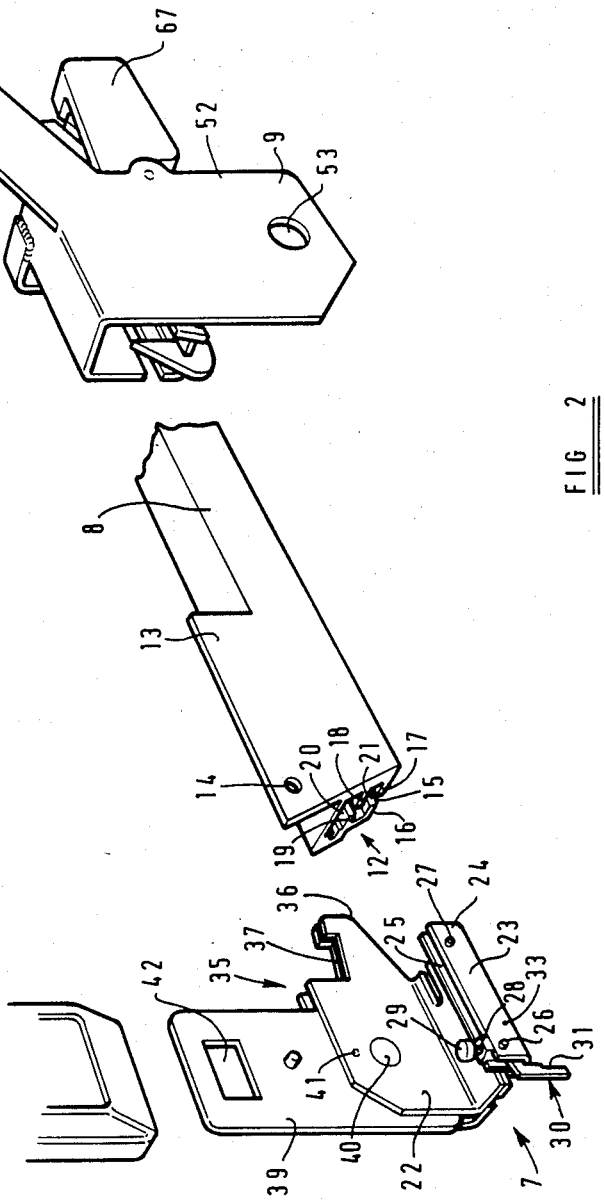
FIG. 2 is an exploded cut away view showing, from one side, part of the track of the safety belt system, a locking station and a carriage, the components being viewed from one side.

Turning now to FIGS. 2 and 3 of the accompanying drawings, the carriage 7, rail 8 and a locking station 9 are shown from one side in FIG. 2, and the carriage 7 and the locking station 9 are shown from the other side in FIG. 3.

The rail 8 comprises an elongate extrusion, 12, for example of aluminium material, and the extrusion may be provided, at convenient positions along its length, with protruding flanges 13 provided with apertures 14 to enable the extrusion to be bolted or rivetted to the body work of a motor vehicle.

The extrusion 12 is of inverted channel configuration. The channel is open 15 at the bottom, in a region between two inwardly directed lips 16, 17, and within the interior of the channel there are two further inwardly directed opposed lips 18, 19, which serve to divide the interior of the channel into an upper relatively large channel portion 20 and a lower relatively large channel portion 21.

The carriage 7 consists of a main movable component which is of generally "U" shaped channel configuration 22. The first wall 23 of the channel is actually formed of two spaced apart parallel plate elements 24, 25, which have a small gap left between them. Guide pins 26, 27 project from both sides of the first wall 23, and these guide pins 26, 27 are dimensioned to be received in the lower relatively large channel portion 21 of the guide rail 2.

Mounted on the top of the first wall 23, at one end of the carriage is an upstanding axle 28 which carries a roller 29 adapted to rotate about a vertical axis. The roller 29 is dimensioned to be received within the upper large channel portion 20 of the guide rail 2 with the axle 28 passing through the space defined between the inwardly directed lips 18 and 19 of the guide rail 8.

A latching lever 30 is mounted in position on the first wall 23, the latching lever 30 having a depending actuating arm 31, and a latching arm 32 which is actually located in position between the two upstanding plate elements 24, 25. The latching lever is pivoted about a pivot axis 33 and, as can be seen from FIG. 4 the latching arm 32 is biassed upwardly by means of a leaf spring 34 which is also located between the plate elements 24, 25.

The other wall 35 of the channel 22, which constitutes the major part of the carrige 7 is also formed by two spaced parallel plates 36, 37 which are of the same configuration. The plates 36, 37 are configured to define, adjacent their forward ends, a hook like recess 38.

A securing plate 39 has a portion thereof located between the plates 36, 37. The securing plate 39 is pivotally connected to the plates 36, 37 by means of a stud or rivet 40 passing through all three plates. A small bore is provided in the plates 36, 37 and in the latching plate 39 at a position above the stud or rivet 40, the small bore containing a soft metal pin or the like 41 which serves to prevent rotation of the latching plate 39 about the axis defined by the stud or rivet 40 under normal circumstances.

The latching plate 39 has an aperture 42 adjacent the free end thereof which is adapted to cooperate with a conventional releasable buckle 43 to which one end of the seat belt 5 is connected. Thus the seat belt 5 is releasably connected to the carriage 7.

The carriage 7 is adapted to be moved along the rail 2 by means of a drive tape 44, shown in FIG. 4. The drive tape is connected to a vertical fish plate 45 provided with two projecting pins 46 which project outwardly on opposite sides of the fish plate 45, these pins being received in the upper channel portion 20 of the rail 8. Thus the fish plate 45 can move axially of the rail 8 but cannot move up and down relative to the rail 8. The underside of the fish plate defines a recess 47 which is dimensioned to receive and engage the free end 48 of the latching arm 32 of the latching lever 30. Since the latching arm 32 is biassed upwardly by the leaf spring 34 normally the free end 48 of the latching arm is biassed into engagement with the recess 47, and thus movement of the drive tape 44 in either direction, to the left or to the right, will cause a corresponding movement of the carriage 7. However, it will be understood from FIG. 4 that if the carriage 7 is moving towards the right as shown in FIG. 4 and the actuating arm 31 of the latching lever 30 engages a fixed object, for example the object 49, then the latching lever will pivot about the pivot pin 33, thus retracting the free end 48 of the latching arm 32 from the recess 47, thus disconnecting the carriage from the fish plate 45. As will become apparent hereinafter when the carriage 7 enters the locking station 9, this is exactly what happens.

Turning now to the locking station 9, it will be seen, from FIGS. 2 and 3 that the locking station consists of a square sectioned tubular housing 50 through which the rail 8 passes. One side wall 51 of the housing is extending to form a depending web 52 provided with an aperture 53 by means of which the housing may be secured to the motor vehicle. This rear wall is also extended upwardly to form an upwardly extending arm 54, the free end of which is provided with an aperture 55 corresponding to the aperture 42 in the latching plate 39. This arm 54 may thus also serve as a latching arm and may receive the buckle 43 provided at the free end of the seat belt 5 in certain circumstances.

The outer side wall 56 of the tubular housing 50 is provided with a slot 57 therein. The slot 57 is generally horizontal, but is wider at the closed end 58 thereof than at the open end 59. The slot is provided with an angular depression or recess 60 in the lower edge of the slot for a purpose that will be described hereinafter.

The side wall 56 of the housing is associated with a strip 61 which is secured to the housing in such a way that strip 61 is parallel with but spaced from the side wall 56. The location of the strip 61 is such that the hook like portion 38 of the carriage 7 may pass through the strip 61 when the carriage enters the locking station.

The above described components are such that as the carriage 7 moves along the rail 8 towards the locking station the wall 35 of the channel 22, and the associated latching plate 39 will move to a position adjacent the side wall 56 of the locking station, with the hook like portion 38 passing between the strip 61 and the side wall 56. The base of the channel 22 enters the slot 57, and the wall 23 remains within the rail 8 that passes through the locking station.

A locking lever 62 is provided and is pivoted about a pivot pin 63 on to the depending web 52. The locking lever is provided with a hook like portion 64 adjacent the free end thereof, this hook like portion being movable in a slot provided in the lowermost wall of the generally square section tubular housing 50. The locking lever 62 is generally in a lowered condition, shown in FIG. 3.

The locking lever 62 has a free end 65 on the opposite side of the pivot pin 63 to the hook like portion 64, and the free end 65 is positioned to cooperate with the actuating arm 66 of a micro switch 67. The housing of the micro switch 67 is integrally formed with an arm 68 which extends into and is secured to the interior of the tubular housing portion 50, thus securing the microswitch in position.

Figure 5:
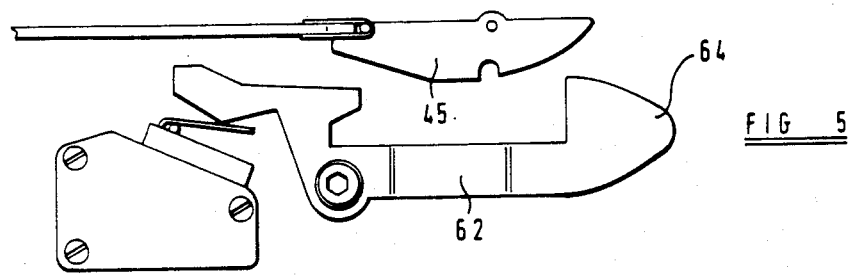
FIG. 5 illustrates part of the locking station as the draw tape enters the locking station, FIG. 6 corresponds to FIG. 5 illustrating the same part of a locking station when the draw tape has fully entered the locking station.
Figure 6:
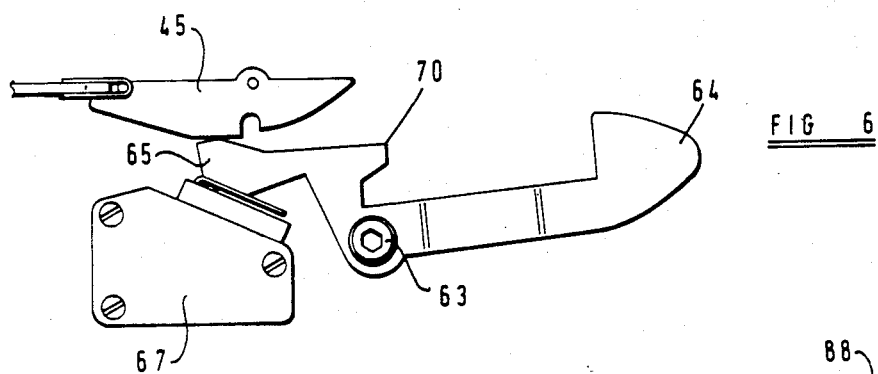

The end 65 of the locking lever 62 is adapted to cooperate with the fish plate 45 described above. As can be seen in FIG. 5, the locking lever 62 is normally in a lowered position, thus permitting the carriage 7 to enter the locking station 9. As the fish plate 45 draws the carriage 7 into the locking station 9 the underside of the fish plate 45 will contact the free end 65 of the locking lever 62, thus causing the locking lever to pivot about the pivot pin 63. This moves the hook-like end 64 upwardly to retain the carriage within the locking station, and also actuates the micro switch 67.

It will be appreciated that the fish plate 45 is, during the entire operation, prevented from moving upwardly since the protruding pins 46 provided on the fish plate are retained within the appropriate part of the channel 8, thus preventing upward movement of the fish plate 45 whilst permitting axial movement thereof.

Figure 7:
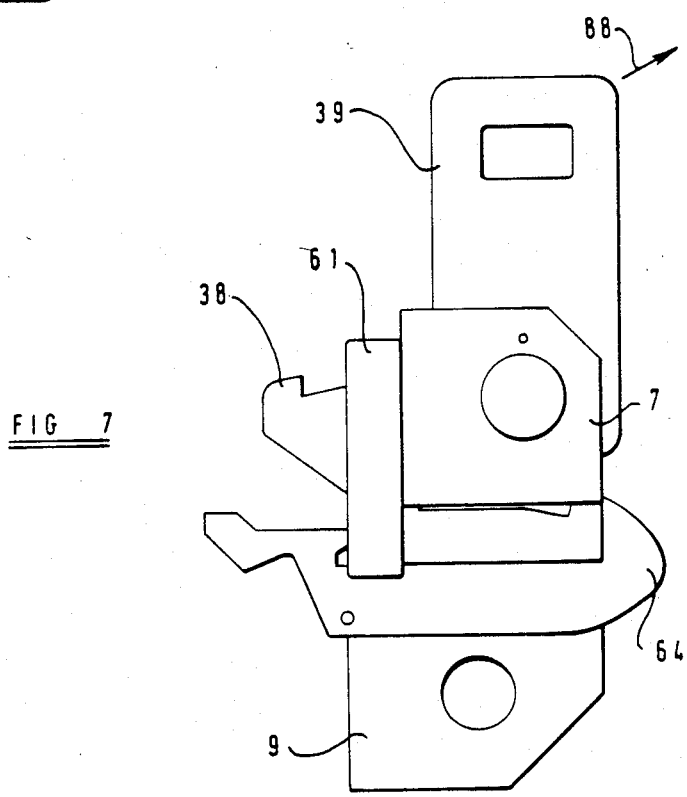
FIG. 7 illustrates the locking carriage in the locking station.

As can be seen from FIG. 7, when the carriage 7 is in the ordinary position within the locking station 9, the hook like portion 64 serves to prevent the carriage from moving out of the locking station. The hook like portion 38 provided on the carriage has passed between the strip 61 and the tubular housing 50, but does not engage this strip. However, the locking lever 62 would not alone be able to withstand a very large force tending to withdraw the carriage from the locking station, such as might occur if an accident should happen.

Figure 8:
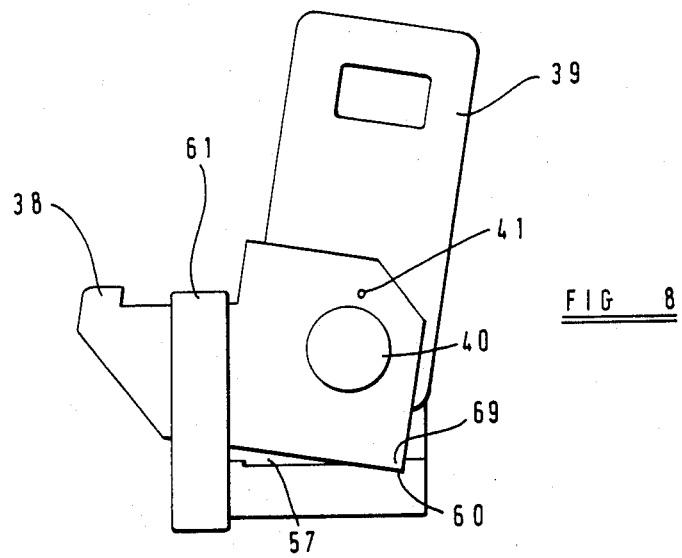
FIG. 8 illustrates the locking carriage in the locking station when subjected to a mild force, for example during an accident, and FIG. 9 corresponds to FIG. 8 showing the situation when subjected to a major force, for example after a major accident.

Should an accident occur a force will be applied to the latching plate 39 (which is connected to the safety belt 5) in the direction illustrated by the arrow 88 in FIG. 7. Thus the force applied to the carriage makes an accute angle with the longitudinal axis of the rail 8. If the force applied in the direction of the arrow 68 is sufficient the protruding pins 27 provided on the side wall 23 of the channel 22 constituting the major part of the carriage 7 may well fracture, and the carriage 7 will then tilt, as shown in FIG. 8. The result of this tilting movement of the carriage is two fold. Firstly the hook like portion 38 provided on the carriage firmly engages the protruding strip 61, so that the carriage is thus effectively locked to the strip 61. Additionally the front lower edge 69 of the carriage becomes inserted in the angular recess 60 defined in the lower part of the groove 57. Thus the carriage is firmly locked in position and, during the accident, is not withdrawn from the locking station.

Figure 9:
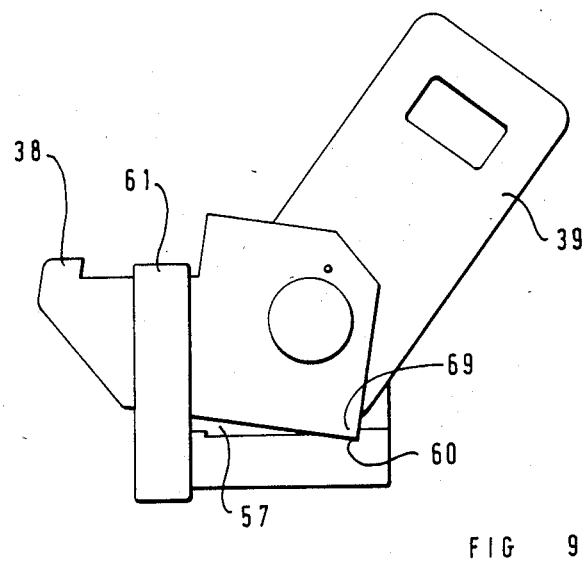

If the force applied to the latching plate 39 is excessive, it is possible that the soft pin or the like 41 that serves to prevent rotation of the latching plate 39 about the stud or rivet 40 may shear, thus permitting the latching plate 39 to rotate about the axis defined by the stud or rivet 40 to occupy the position shown in FIG. 9. It will be seen that even in the position illustrated in FIG. 9 the hook like portion 38 is still engaging the strip 61 and also the front lower edge 69 of the carriage is still inserted securely in the recess 60 formed in the lower edge of the slot 57.

In operation of the above described embodiment of the invention initially the carriage 7 will be located at a forwardmost position, as described above. On actuation of the seat belt arrangement the motor 10 will be acuated, thus drawing in the drive strip 44, thus pulling the carriage towards the locking station 9.

When the carriage reaches the locking station 9 two separate but related chains of events happen.

Firstly, as the carriage enters the locking station 9, part of the locking station (shown as part 49 in FIG. 4) engages the depending arm 31 of the latching lever 30. This causes the latching lever to rotate about the pivot 33, thus disengaging the free end 48 of the latching arm 32 of the latching lever from the recess 47 in the fish plate. The fish plate is thus disconnected from the carriage, and the fish plate continues to move, whilst the carriage remains stationary.

The carriage is then in the position illustrated in FIG. 7 with the hook-like part of the carriage 38 having passed between the strip 61 and the wall 56 of the tubular housing 50. The base of the channel 22 that constitutes the main part of the carriage 7 is located in the slot 57, with the wall 23 of the channel 22 still in position within the part of the rail 8 that passes through the tubular housing portion 50. The motor 10 continues to draw the fish plate along until the underside of the fish plate touches the free end 65 of the locking arm 62. This causes the locking arm 62 to pivot about the pivot axis 63, thus causing the hook like end portion 64 to rise within the square sectioned hollow housing 50. This serves to prevent the carriage 7 from being withdrawn from the housing. The downward movement of the free end 65 of the locking lever 62 actuates the microswitch which, via a relay, switches off the motor. The motor then stops although there will be a certain small amount of run-on, since there will be a certain amount of inertia. However, it will be noted that the motor does not stop suddenly whilst under load and thus no severe shocks are imparted to the motor. By virtue of the design of the fish plate 45 even if there is some run-on the free end 65 of the locking lever 62 is still held down by the fish plate.

When the carriage is to be disengaged from the locking station, in response to an appropriate signal the motor will operate in a reverse sense, thus driving the fish plate away from the free end of the locking lever. The locking lever will thus move again to the disengaged position. As the lever moves forwardly to the disengaged position a projection 70 formed on the lever nudges the carriage forwards sufficiently for the latching arm 30 to return to its initial position. As the fish plate advances, the free end 48 of the latching arm 32 engages the undersurface of the pointed leading end of the fish plate, and will be driven downward against the upward biassing imparted by the spring 34. The free end 48 of the latching arm 32 will thus again be brought into engagement with the recess 47 in the fish plate 48, thus re-establishing the connection between the carriage 7 and the drive tape 44. The carriage 7 will thus be driven out of the locking station by the action of the drive tape 44. The carriage will be moved to the forwardmost position, as shown in FIG. 1 when the motor 7 will again be switched off by some appropriate control arrangement.

Should an accident arise when the carriage is in the locking station, as has been described above, the carriage will be safely retained within the locking station and is able to withstand a significant applied force.

It is to be noted that since the seat belt 5 is connected to the carriage 7 by means of a releasable buckle 43 which engages the latching plate 39 formed on the carriage 7, in the unlikely event of a malfunction of the described apparatus, or if an accident arises, it will be possible for the person in the motor vehicle to be released merely by disengaging the releasable buckle 43 from the latching plate 39.

If the malfunction is such that the carriage 7 is fixed in its forwardmost position and if the person still wishes to use the safety belt arrangement, the buckle 43 at the free end of the belt 5 can be disengaged from the latching plate 39 and may then be engaged with the latching arm 54 provided on the locking station. Such an expedient, whilst slightly inconvenient, is sufficiently practicable to enable the described seat belt system to be utilised even if a malfunction should occur.

Whilst the locking housing and carriage arrangement have been described in connection with one specific embodiment of a safety belt system in which the rail that the carriage moves along is substantially horizontal and is located between a seat and one side of a motor vehicle, it is to be appreciated that a carriage and locking station of the type described may be utilised in other forms of safety belt arrangements. In particular a safety belt arrangement in which a rail that the carriage moves along may be positioned substantially vertical. Such a safety belt arrangement may be utilised in a motor vehicle which has a "B" post.

Whilst the invention has been described by way of example with reference to one specific embodiment of the invention many modifications may be effected to the invention without departing from the scope thereof. For example, the described arrangement may be modified to be a "three point fixing" belt, rather than the illustrated two point fixing. In such a case it will not be the free end of the belt 5 fixed to the carriage, but instead an intermediate part of the belt, the free end of the belt being anchored, for example, to the floor of the car at a position between the two seats. Many other modifications can also be envisaged. Also the latching plate may be mounted on the carriage in such a way that the latching plate can rotate slightly about an axis passing through the carriage. Thus the latching plate may still be mounted by means of a stud or rivet as described, but instead of the soft metal pin extending through three aligned bores it can pass through two bores in the spaced apart plates forming part of the carriage, and through an arcuate slot formed in the latching plate. Thus the latching plate can rotate by a predetermined amount about the stud or rivet, and if a sufficient force is applied to the soft metal pin it will break to let the latching plate rotate beyond said predetermined amount.

What is claimed is:

1. A safety belt arrangement for a motor vehicle, the motor vehicle having a length and a width, said safety belt arrangement comprising a retractor reel for a safety belt, and guide means for guiding the belt from said reel, said guide means being located at a position substantially in the centre of the width of the motor vehicle to guide the belt over the shoulder of a person sitting on a seat in the motor vehicle, the belt passing to a carriage, which is movable along a rail, motor means being provided to move the carriage along the rail, the rail being a substantially horizontal rail located at a position between the seat and the side of the vehicle.

2. A safety belt arrangement according to claim 1 wherein a locking station is provided on the rail adjacent the seat, the locking station being adapted lockingly to receive the said carriage.

3. A safety belt arrangement according to claim 1 wherein the safety belt is releasably connected to the carriage.

4. A safety belt arrangement according to claim 3 wherein the safety belt is releasably connected to the carriage by means of a releasable buckle, the locking station being provided with fixed means adapted to receive said releasable buckle.

5. A safety belt arrangement according to claim 1 wherein said rail is secured to the floor of the motor vehicle at a position between the seat and the side of the motor vehicle.

6. A safety belt arrangement according to claim 1 wherein the rail is secured to the door sill of the motor vehicle.

7. A safety belt arrangement according to claim 6 wherein the rail is formed integrally with the door sill of the motor vehicle.

8. A safety belt arrangement according to claim 1, wherein one end of said rail is upwardly curved.

9. A safety belt arrangement for use in a motor vehicle, said safety belt arrangement incorporating a safety belt attached to a carriage movable along a rail associated with a locking station adapted lockingly to receive the carriage in such a position that under accident conditions the force applied to the said carriage by said safety belt defines an axis making an acute angle with said rail, a housing being provided with a detent adapted to cooperate with part of the carriage, said carriage being adapted to be moved into and out of the housing and along the rail without said part of the carriage coming into engagement with said detent, said carriage being adapted to move from its normal position within the housing when subjected to a force applied to said carriage by said safety belt under accident conditions to bring said part of the carriage into engagement with said detent to prevent the carriage from emerging from the locking station.

10. A safety belt arrangement according to claim 9 wherein the carriage incorporates a hook-like projection which, when the carriage enters the locking station is located adjacent said detent, said hook-like projection being located to engage said detent when the carriage is moved from its normal position in the housing when subjected to said force.

11. A safety belt arrangement according to claim 10 wherein the detent is constituted by an element secured to the housing but having part spaced therefrom to enable the hook-like projection to pass between said part and said housing.

12. A safety belt arrangement according to claim 10 wherein the carriage comprises a substantially "U" sectioned channel member, one side wall of which defines said hook-like projection.

13. A safety belt arrangement according to claim 9 wherein the carriage incorporates a part which is inserted into a slot formed in said locking station when the carriage is received within the locking station, one part of the slot defining a recess adapted to receive part of the carriage when the carriage is moved from its normal position within the housing when subjected to said force.

14. A safety belt arrangement according to claim 13 wherein said slot is a closed slot, the slot being broader at its closed end than at its open end, to permit tilting of the carriage whilst said part of the carriage is retained within the slot, the tilting of the carriage causing said part to enter said recess.

15. A safety belt arrangement according to claim 13 wherein said carriage comprises a substantially "U" section member, the base of the channel being adapted to be received within said slot.

16. A safety belt arrangement according to claim 10 wherein the locking station is provided with a locking member, means being provided to move the locking member to a locking position to retain the carriage in the locking station when the carriage has been received in the locking station.

17. A safety belt arrangement according to claim 16 wherein the connecting element is adapted to engage part of said locking member to move the locking member to the locking position.

18. A safety belt arrangement according to claim 9 wherein motor means are provided associated with an elongate drive member adapted to move said carriage, means being provided, adapted to be actuated when the carriage enters the locking station to switch off the motor.

19. A safety belt arrangement according to claim 1 18 wherein said elongate drive element is provided with an elongate connecting element which is releasably connected to the carriage so that the drive element can be connected to and disconnected from the carriage.

20. A safety belt arrangement according to claim 19 wherein a spring biassed member is provided on the carriage which is adapted to be normally biassed into driving engagement with said connecting element, means being provided to disconnect said spring biassed member from the connecting element at the locking station.

21. A safety belt arrangement according to claim 20 wherein said spring biassed member forms part of a pivoted lever arrangement, a further part of the pivoted lever arrangement being located to engage a fixed element when the carriage enters the housing to cause the lever to pivot, thus disconnecting the lever from the connecting element.

22. A safety belt arrangement according to claim 20 wherein the connecting element defines a recess adapted to engagingly receive part of said spring biassed member.

23. A safety belt arrangement according to claim 18 wherein movement of the locking member actuates switch means, the switch means being connected so that actuation of the switch means causes said motor to be switched off.

24. A safety belt arrangement according to claim 9 wherein a mmotor is provided associated with an elongate drive element adapted to drive said carriage.

25. A safety belt arrangement according to claim 9 wherein the carriage is mounted on the rail by protruding elements which are engaged in recesses formed in the rail, one or more of the protruding elements being deformed as the carriage moves from its normal position when subjected to said force.

26. A safety belt arrangement according to claim 9 wherein the safety belt is releasably attached to said carriage.

27. A safety belt arrangement according to claim 26 wherein the safety belt is releasably attached to said carriage by means of a releasable buckle, additional means being provided on the locking station adapted to receive said buckle to enable the safety belt to be buckled to the locking station instead of being buckled to the carriage.

28. A safety belt arrangement according to claim 9 wherein the safety belt is attached to a retractor reel, guide means being provided for guiding belt from said reel, said guide means being located at a position at or adjacent the centre of the motor vehicle to guide the belt over the shoulder of a person sitting on a seat of the motor vehicle, the belt then passing to the carriage, the said rail being substantially horizontal and being located at a position between the seat and the side of the car.

29. A safety belt arrangement according to claim 28 wherein the locking station is provided on the rail adjacent the back of the seat.

30. A safety belt arrangement according to claim 9 wherein the rail is secured to the floor of the motor vehicle at a position between the seat and the side of the motor vehicle.

31. A safety belt arrangement according to claim 9 wherein the rail is secured to the door sill of the motor vehicle.

32. A safety belt arrangement according to claim 31 wherein the rail is formed integrally with the door sill of the motor vehicle.

33. A safety belt arrangement according to claim 9, wherein one end of said rail is upwardly curved.

* * * * *